Oct. 29, 1935.  A. P. BALL  2,019,111
VEHICLE BODY CONSTRUCTION
Filed Dec. 16, 1932
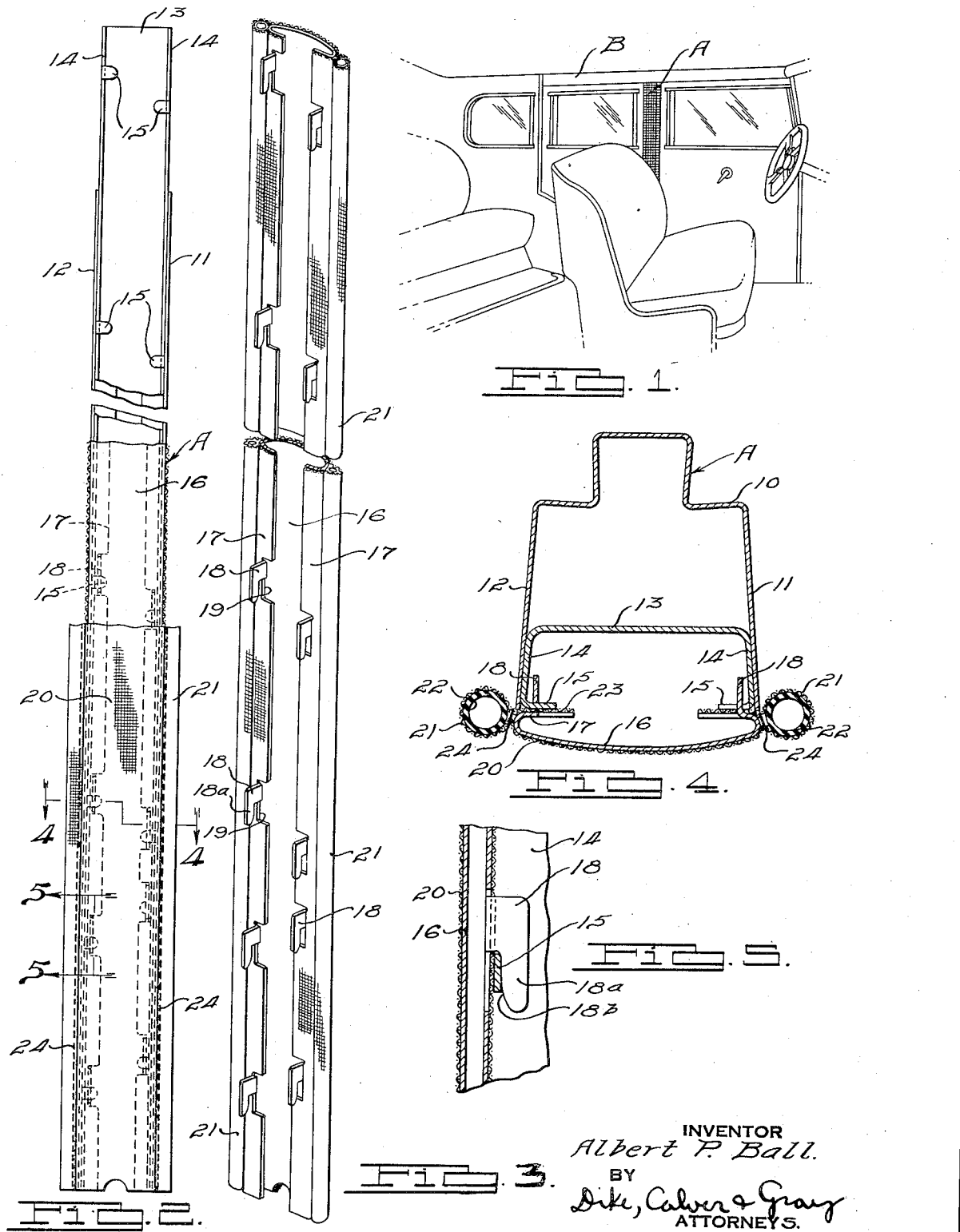
INVENTOR
Albert P. Ball.
BY
Dike, Calver & Gray
ATTORNEYS.

Patented Oct. 29, 1935

2,019,111

UNITED STATES PATENT OFFICE

2,019,111

VEHICLE BODY CONSTRUCTION

Albert P. Ball, Detroit, Mich., assignor to Briggs Manufacturing Company, Detroit, Mich., a corporation of Michigan Application December 16, 1932, Serial No. 647,651

12 Claims. (Cl. 296—28)

This invention relates to vehicle body construction and more particularly to improvements in the construction and assembly of interior trim portions of automobile bodies. The invention is especially advantageous in connection with the application of trim material to body pillars, such for example as the center pillars of sedan bodies.

Heretofore it has been the conventional practice in the manufacture of automobile bodies and in connection, for instance, with the trimming of the center pillars to provide wood inserts in the channel shaped pillars and then fasten thereto strips of trim material by suitable means, such as concealed snap fasteners, wood screws, nails or the like, in such manner that the fastening devices will be concealed from sight by the fabric covering material. Such methods require considerable time, labor and expense in production.

An object of the present invention is to eliminate these disadvantages, simplify and improve the construction of the trim portions of the body, and in particular to provide an improved and more efficient means for trimming the pillars of automobile bodies whereby substantial manufacturing economies are obtained while at the same time providing a more satisfactory construction.

The present application is a continuation in part of my application, Serial No. 640,235, filed October 29, 1932.

Other objects of this invention will appear in the following description and appended claims, reference being had to the accompanying drawing forming a part of this specification wherein like reference characters designate corresponding parts in the several views.

Fig. 1 is an interior perspective view of an automobile body wherein the center pillars are trimmed in accordance with the present invention.

Fig. 2 is an elevation, partly broken away, illustrating a body pillar trimmed in accordance with the invention.

Fig. 3 is a perspective view in elevation illustrating a trim panel or strip.

Fig. 4 is a transverse section taken substantially through lines 4—4 of Fig. 2 in the direction of the arrows.

Fig. 5 is a fragmentary vertical section taken substantially through lines 5—5 of Fig. 2 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the present embodiment the invention is illustrated by way of example in connection with the trimming of a center pillar A of an automobile body B. The pillar A is in the form of a metal stamping and is generally channel shaped in construction having an outer rabbeted portion 10 and inwardly extending side flanges 11 and 12 forming jamb portions for the doors. Inserted within the inner ends of these side flanges is a vertically extending channel shaped reinforcing member 13 having side flanges 14 secured to the sides 11 and 12 of the pillar channel as by spot welding. In the present instance the flanges 14 of the reinforcing member are provided with fastener means adapted to cooperate with fastener means carried by a trim panel or strip for securing the strip in position so as to cover the inner face of the door pillar. The fastener means carried by the door pillar comprises, in the present instance, a series of lugs or tongues 15 projecting inwardly from the free edges of the flanges 14 and preferably formed integrally from the metal thereof.

The trim panel or strip which spans the inner open face of the pillar channel comprises a foundation or backing strip or sheet 16 of sheet material, preferably sheet metal. The longitudinal edges of the sheet metal strip 16 may be folded back upon the strip to provide inwardly extending flanges or folds 17, the strip being thus formed preferably into channel shape. At intervals along each of the edges of the folds or flanges 17 the metal is punched or pressed at 19 to provide fastener members 18 which project outwardly at right angles to the plane of the flanges 17. The fastener members 18 are in the form of hook shaped devices having hooked ends 18a opening downwardly, the inner edges of the hooked ends being inclined or tapered at 18b.

The channel shaped backing strip 16 is covered with a strip of trim fabric 20 which is preferably cemented thereto. In accordance with one aspect of the present invention the trim fabric is prepared, before it is applied to the backing member 16, so as to incorporate therewith a wind cord along each longitudinal edge of the trim panel. Accordingly the fabric strip 20 adjacent each edge thereof may be looped at 21 around a length of rubber tubing or other core member 22, the tubing being held in position by stitching at 24 across the base of the loop 21 as shown in Fig. 4. The fabric strip may thus be preformed to embody a yieldable wind cord along each edge thereof, and when the fabric is cemented to the backing strip 16 the wind cords will be properly located along the vertical edges of the pillar, the inner edge portions 23 of the fabric extending over the folds or flanges 17 and cemented thereto.

It will be understood that the fastener lugs or hooks 18 are formed at the proper locations in the length of the trim panel so as to cooperate with the correspondingly positioned lugs or tongues 15 on the pillar reinforcing channel 13. The trim panel or strip may be readily assembled with the body frame member by positioning the same against the inner vertical edges of the pillar so that the hooked ends 18a of the fastener members will clear the lugs 15. The trim panel is then slid or forced downwardly in an endwise direction to hook the devices 18 over the lugs 15, the panel being drawn firmly into position against the pillar by a wedging action due to the tapered edges 18b of the fastener members.

I claim:

1. A body pillar comprising a metal stamping forming a door jamb along at least one longitudinal edge thereof, a channel shaped reinforcing member secured therein, metallic fastener portions integral with said member, and a trim panel provided with a backing sheet having projecting fastener devices adapted to interlock with said fastener portions, a wind cord adapted to overhang a longitudinal edge of said door jamb, and a fabric covering extending over said trim panel and said wind cord and forming a unitary structure thereof.

2. A body pillar comprising a metal stamping, a channel shaped reinforcing member secured therein, metallic fastener portions integral with said member, and a trim panel provided with a backing sheet having its longitudinal side edge portions turned inwardly toward one another at the back of the sheet to provide flanges having vertical wedge-shaped projecting fastener devices adapted to interlock with said fastener portions and clamp the panel in position by wedging action.

3. A trim panel adapted to be applied to a pillar of a vehicle body in which the pillar includes a channel shaped member having fastener portions at its edges; a fabric covered backing strip formed to provide opposed inturned flanges at its longitudinal edges spaced from said strip, and hooks formed from said flanges and adapted to engage the fastener portions of said pillar for attaching said strip to the pillar.

4. A trim panel adapted to be applied to a vehicle body pillar having fastener members formed thereon, comprising a metal backing strip having opposed inturned flanges along its longitudinal edges, said flanges being spaced from said strip, and hooks on each of said flanges arranged in staggered relation and adapted to engage the fastener members on said body pillar.

5. A trim panel for a vehicle body pillar comprising a metal backing sheet having its longitudinal side edge portions turned inwardly toward one another at the back of the sheet to provide flanges spaced from said sheet, and rows of longitudinally extending fastener members carried by said flanges and arranged in staggered relation.

6. A trim panel including a fabric covered metal backing sheet curved transversely to provide a convex outer face and having its longitudinal side edge portions turned inwardly toward one another at the back of the sheet to provide flanges spaced from said sheet, and rows of longitudinally extending fastener members carried by said flanges and arranged in staggered relation.

7. A trim panel adapted for attachment to a vehicle body pillar including a metal backing sheet, a wind cord associated with said panel, a fabric covering extending over said backing sheet and said wind core and forming a unitary structure thereof, said panel having its longitudinal side edge portions turned inwardly toward one another at the back of the sheet and spaced from the sheet to provide longitudinally extending flanges, and rows of fastener members carried by said flanges, portions of said fabric being wedged between said flanges and the pillar when the panel is attached to the pillar.

8. A hollow body pillar, a channel shaped reinforcing member secured in said pillar and having inturned fastener portions, and a trim panel having inturned flanges adapted to extend substantially parallel to said fastener portions, each of said flanges having a series of fastener elements cooperating with the corresponding fastener portions of said pillar and extending at right angles thereto.

9. A hollow body pillar, a channel shaped reinforcing member secured in said pillar and having a plurality of inwardly projecting spaced fastener portions, and a trim panel having inturned flanges adapted to extend substantially parallel to said fastener portions, each of said flanges having a series of integral struck-out fastener elements cooperating with the corresponding fastener portions of said pillar.

10. A trim panel adapted to be applied to a vehicle body pillar having fastener members therein, comprising a metal backing sheet having the side edges thereof turned in to provide opposed inturned flanges along the longitudinal edges of the backing sheet, said flanges having projecting fastener portions formed from the metal thereof and adapted to engage said fastener members on the pillar to clamp said backing sheet to the pillar.

11. A trim panel adapted to be applied to a vehicle body pillar having fastener members therein, comprising a metal backing sheet having the side edges thereof turned in to provide opposed inturned flanges along the longitudinal edges of the backing sheet, said flanges having fastener portions formed from the metal thereof and projecting inwardly approximately at right angles to said flanges and adapted to engage said fastener members on the pillar to clamp the backing sheet to the pillar.

12. A trim panel adapted to be applied to a vehicle body pillar having fastener members therein, comprising a metal backing sheet having the side edges thereof turned in to provide opposed inturned flanges along the longitudinal edges of the backing sheet, said flanges having fastener portions formed from the metal thereof and projecting inwardly approximately at right angles to said flanges and adapted to engage said fastener members on the pillar to clamp the backing sheet to the pillar, said fastener portions being wedge-shaped and effective to clamp the panel in position by wedging action.

ALBERT P. BALL.